United States Patent [19]
Bookbinder et al.

[11] Patent Number: 6,122,430
[45] Date of Patent: *Sep. 19, 2000

[54] OPTICAL DEVICE AND FUSION SEAL

[75] Inventors: Dana Bookbinder, Corning; Joel Carberry, Horseheads; Steven Demartino, Elmira; Gaylord Francis, Painted Post; Scott Glaeseman, Corning; Robert Morena, Lindley; Brent Wedding, Corning, all of N.Y.

[73] Assignee: Corning Incorporated, Corning, N.Y.

[*] Notice: This patent is subject to a terminal disclaimer.

[21] Appl. No.: 09/317,296

[22] Filed: May 24, 1999

Related U.S. Application Data

[63] Continuation of application No. 08/903,614, Jul. 31, 1997, Pat. No. 5,926,599, which is a continuation-in-part of application No. 08/665,124, Jun. 13, 1996, Pat. No. 5,721,802.

[51] Int. Cl.[7] .................................................. G02B 6/00
[52] U.S. Cl. .............................. 385/137; 385/41; 385/42; 385/147
[58] Field of Search .................................. 385/41, 42, 49, 385/71, 88, 96, 99, 137, 147, 130; 428/218

[56] References Cited

U.S. PATENT DOCUMENTS

| | | |
|---|---|---|
| 4,209,229 | 6/1980 | Rittler . |
| 4,725,110 | 2/1988 | Glenn et al. . |
| 4,778,242 | 10/1988 | Ota et al. . |
| 4,830,448 | 5/1989 | Okazaki et al. . |
| 4,865,414 | 9/1989 | Ohta et al. . |
| 5,042,898 | 8/1991 | Morey et al. . |
| 5,080,962 | 1/1992 | Hench . |
| 5,243,680 | 9/1993 | Soane . |
| 5,246,890 | 9/1993 | Aitken et al. . |
| 5,281,560 | 1/1994 | Francis et al. . |
| 5,367,589 | 11/1994 | MacDonald et al. . |
| 5,426,714 | 6/1995 | Gadkaree et al. . |
| 5,470,804 | 11/1995 | Morena . |

(List continued on next page.)

FOREIGN PATENT DOCUMENTS

| | | |
|---|---|---|
| 0 480 186 A1 | 4/1992 | European Pat. Off. . |
| 0 553 492 A2 | 8/1993 | European Pat. Off. . |
| 0 828 169 A2 | 3/1998 | European Pat. Off. . |
| WO 97/26572 | 7/1997 | WIPO . |
| WO 97/31869 | 9/1997 | WIPO . |
| WO 98/17968 | 4/1998 | WIPO . |
| WO 98/17969 | 4/1998 | WIPO . |
| WO 98/27446 | 6/1998 | WIPO . |

OTHER PUBLICATIONS

Weidman et al., A Novel Negtive Expansion Substrate Material for Athermalizing Fiber Bragg Gratings, MoB.3.5, 22$^{nd}$ European Conf. on Optical Comm. EEOC'96, Oslo, pp. 1.61–1.63.

(List continued on next page.)

*Primary Examiner*—Phan T.H. Palmer
*Attorney, Agent, or Firm*—Svetlana Short; Edward Murphy, III

[57] ABSTRACT

An optical device, and a method of producing the device, are disclosed. The device comprises a substrate and an optical waveguide component affixed to the substrate with a glass frit fusion seal formed and locked within a recessed void in the substrate, the glass frit fusion seal being the fused product of a low melting glass frit. The recessed void in the substrate includes a region for receiving the optical waveguide component and an intersecting region that secures the placement of the glass frit fusion seal. The optical waveguide component is affixed to the substrate in order to control temperature varying optical properties of the component.

21 Claims, 4 Drawing Sheets

U.S. PATENT DOCUMENTS

| | | |
|---|---|---|
| 5,500,917 | 3/1996 | Daniel et al. . |
| 5,516,733 | 5/1996 | Morena . |
| 5,602,949 | 2/1997 | Epworth . |
| 5,682,453 | 10/1997 | Daniel et al. . |
| 5,694,503 | 12/1997 | Fleming et al. . |
| 5,721,802 | 2/1998 | Francis et al. .......................... 385/137 |
| 5,757,540 | 5/1998 | Judkins et al. . |
| 5,926,599 | 7/1999 | Bookbinder et al. ................... 385/137 |

OTHER PUBLICATIONS

Reliability of Passive Optical Components, A glass Solder Process for Packaging Fibre Optic Components, H.S. Daniel, D. R. Moore, V. J. Tekippe, Gould Electronics, Inc. (Glen Burnie, USA), EFOC & N '94, Optical Components Fibres and Cables, Jun. 22–24, 1994, pp. 126–129.

Temperature–compensated Optical Fibre Bragg Gratings, G. W. Yoffe, P. A. Krug, F. Ouellette, D. Thorncraft, Optical Fibre Tech. Ctr., U of Sidney, New South Wales 2006, Australia, OFC'95 Tech. Digest, pp. 134–135.

OPTICAL DEVICE AND FUSION SEAL

This application is a continuation of Ser. No. 08/903,614 filed Jul. 31, 1997 U.S. Pat. No. 5,926,599, which is a C-I-P of Ser. No. 08/665,124 filed Jun. 13, 1996, U.S. Pat. No. 5,721,802.

FIELD OF THE INVENTION

An optical device comprising a negative, or near-zero, expansion substrate and an optical component sealed thereto with a fusion seal.

BACKGROUND OF THE INVENTION

It is common practice to use a fusion seal as a means of joining component parts to form a composite article. Heretofore, fusion seals have been used in producing such articles as electric lamps, cathode ray tubes, and other display devices.

A major consideration in producing these articles has been a coefficient of thermal expansion (CTE) match. This has required that the ultimate seal have a CTE that is a reasonably close match with the CTEs of the component parts being sealed. In a cathode ray tube, for example, it is customary for the glass components to have a CTE on the order of $95-105 \times 10^{-7}/°$ C.

The present invention is concerned with optical articles, or devices, such as planar waveguides, waveguide gratings, couplers, and filters. In such articles, an optical fiber may be attached to a substrate having a near-zero, or a relatively large negative, CTE. For this purpose, a fusion seal must be firmly adherent to both the substrate and the fiber. The adherence must be sufficient to permit transfer of strain across the frit seal, that is, between the substrate and the fiber.

Index of refraction changes may be induced in optical fibers, such as silica and germania-silica fibers, by UV light. Fibers, so altered, are useful in producing complex, narrow-band optical components, such as filters and channel add/drop devices. These devices can be an important part of multiple-wavelength telecommunication systems. A reflective grating (or Bragg grating) is a photosensitive device which reflects light over a narrow wavelength band. Typically, these devices have channel spacings measured in nanometers.

Various constructions of optical filters are known which utilize the Bragg effect for wavelength selective filtering. One method for constructing a filter involves imprinting at least one periodic grating in the core of the optical fiber. The core is exposed through the cladding to the interference pattern of two ultraviolet beams. This results in a reflective grating which may be oriented normal to the fiber axis.

In silica and germania-silica fiber reflective gratings, variations in center wavelength are dominated by the change of refractive index with temperature. The frequency of the light reflected by the fiber grating varies with the temperature of the grating region. Consequently, such a filter cannot be used in applications where the reflected light frequency is to be independent of temperature.

The desirability of devising a system insensitive to temperature change is apparent. Provisional application Ser. No. 60/010,058, filed Jan. 16, 1996, describes an athermal device in which a thermally sensitive component having a positive CTE is affixed at two spaced locations on the upper surface of a substrate having a negative CTE. A lithia aluminosilicate glass-ceramic, beta-eucryptite, is suggested as a substrate to use in such a device. It is also taught that the item attached to the substrate, such as an optical fiber, may be attached by an organic polymer cement, an inorganic frit, or a metal.

It is a purpose of the present invention to provide an optical device comprising an optical component having a positive CTE in combination with a substrate having a near-zero, or negative, CTE. A further purpose is to provide such an article in which the component is attached to the substrate by a fusion seal. Another purpose is to provide a sealing material that has good sealing properties, that has a low CTE, and that will form an adherent seal between the optical component and the substrate. A still further purpose is to provide a method of producing such an optical device embodying a fusion seal.

SUMMARY OF THE INVENTION

The article of the invention is an optical device comprising a substrate having a near-zero, or negative, CTE and an optical component affixed to the substrate with a fusion seal, the seal being the fused product of a low melting glass frit having a positive CTE and a mill addition of a glass-ceramic having a negative CTE.

The invention further resides in a method of producing such an optical device which comprises blending a low melting glass frit having a positive CTE with a mill addition of a glass-ceramic having a negative CTE, forming a sealing paste with the blend, applying the paste to a surface on the substrate, positioning the optical component over the sealing paste, and heating the paste to a temperature, and for a time, to form a seal between the component and the substrate.

PRIOR ART

Figure 1:
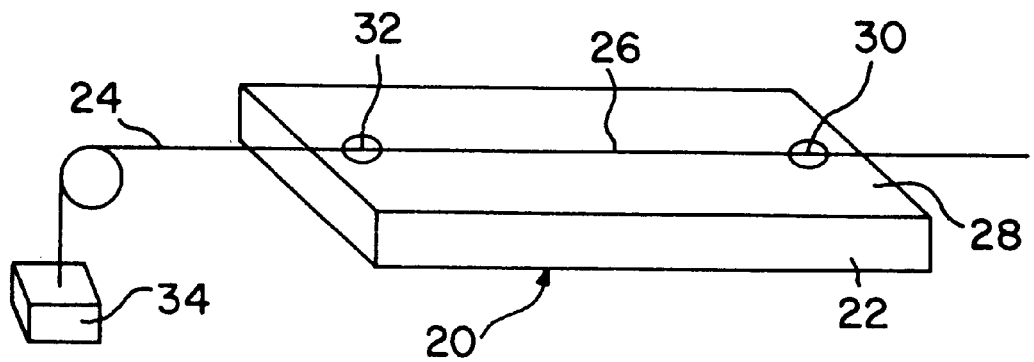
FIG. 1 in the accompanying drawing is a side-view showing a typical optical device embodying the invention.

Literature of possible relevance is described in a separate document.

DESCRIPTION OF THE INVENTION

The present invention arose in the course of devising an effective means of adherently affixing an optical fiber to a substrate of much lower CTE. Consequently, the invention is described with reference to such article and its development. However, it will be apparent that the invention is not so limited, but that it applies generally to fusion seals in optical devices.

In making a fusion-type seal, the sealing material must be heated to a temperature where it becomes soft enough to wet the sealing surface and form an adherent bond. For many purposes, it is desirable to maintain the sealing temperature as low as possible. Accordingly, glass frits that form seals at temperatures below 500° C., preferably 400–500° C., are often referred to as low melting, or mid-temperature, sealing glasses.

The vitreous material used in making a fusion seal is customarily used in powder form, and is termed a glass frit. Sealing glass frits are commonly mixed with an organic vehicle, such as amyl acetate, to form a flowable, or extrudable, paste. This paste mixture is then applied to a sealing surface, in this case the substrate of the device. A difference often exists between the CTE of a component being sealed and that of the sealing glass frit. A mill addition may be made to provide an expansion match between the frit and the component.

In addition to flow and expansion compatibility, a sealing glass frit desirably possesses a number of other favorable characteristics. These include good wettability of the parts being sealed, and compatibility with organic vehicles. In particular, the frit should be compatible with the customary vehicle and binder of nitrocellulose and amyl acetate.

Lead-zinc-borate sealing glasses, either crystallizing or non-crystallizing, have been used commercially over a long period of time in producing fusion seals. In general, this glass family consists essentially of 68–82% PbO, 8–16% ZnO, 6–12% $B_2O_3$, and, optionally, up to 5% $SiO_2$, BaO and $Al_2O_3$. Such glasses are generally useful with sealing temperatures on the order of 430–500° C.

More recently, a family of non-lead, tin-zinc-phosphate sealing glasses has been developed. Such glasses are described in detail in U.S. Pat. No. 5,246,890 (Aitken et al.) and U.S. Pat. No. 5,281,560 (Francis et al.). The glasses described in these patents are lead-free, and provide somewhat lower sealing temperatures in the range of 400–450° C.

The Aitken et al. glasses are of particular interest for use in producing seals in cathode ray tube envelopes because of their relatively low tin oxide contents. In addition to being lead-free, these glasses have compositions containing 25–50 mole % $P_2O_5$ and SnO and ZnO in amounts such that the molar ratio of SnO:ZnO is in the range of 1:1 to 5:1. The glass compositions may further contain up to 20 mole % of modifying oxides including up to 5 mole % $SiO_2$, up to 20 mole % $B_2O_3$, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

The Francis et al. glasses employ SnO and ZnO in a mole ratio greater than 5:1. They also contain, in their composition, at least one stabilizing oxide selected from the group consisting of up to 25% $R_2O$, up to 20% $B_2O_3$, up to 5% $Al_2O_3$, up to 5% $SiO_2$, and up to 5% $WO_3$.

For present purposes, a sealing glass frit may be prepared by melting a glass batch of suitable composition. The glass melt is cooled, preferably by chilling it to form fractured pieces, and then crushed to form a glass powder (frit). The glass frit is then blended with a mill addition in accordance with the invention. The blend is mixed with a vehicle and binder to form a paste having a viscosity suitable for application to the sealing surface.

The traditional vehicle and binder for use in sealing cathode ray tubes has been a mixture of nitrocellulose and amyl acetate. Recently, a vehicle that avoids volatile organic compounds has been developed. This vehicle, an aqueous solution of a cellulosic polymer, is disclosed in Provisional Application Ser. No. 60/012,330. This application was filed Feb. 27, 1996, is assigned to the same assignee as the present application, and is incorporated herein by reference. Either vehicle may be employed, as well as any other suitable vehicle, in carrying out the present invention.

The present invention has been developed for use in waveguide applications, such as gratings bonded to a near-zero, or negative, expansion substrate. Near-zero signifies a CTE value of $0\pm10\times10^{-7}/°$ C. over the temperature range of 0–300° C. Typical materials are the fused silicas. A negative CTE means that the expansion has a negative slope.

The substrate may be formed from the beta-eucryptite glass-ceramic. In that case, the mill addition employed is at least predominantly a pyrophosphate. A suitable pyrophosphate has a generic formula, $2(Co,Mg)O \cdot P_2O_5$. This crystal undergoes a phase inversion at a temperature in the range of 70–300° C. The exact temperature depends on the Co level.

Except for the phase inversion, the material would have a positive CTE over the 0–300° C. range. However, a volume change results from the phase inversion. This has the net effect of lowering the CTE of the system deep into the negative. The specific material we employ with a beta-eucryptite substrate contains 28 cation % CoO.

Alternatively, the substrate may be a fused silica. In that case, the sealing glass blend may employ, as a glass-ceramic mill addition, a pyrophosphate in conjunction with a material having a very low, or negative, expansion coefficient. The material may, for example, be a beta-eucryptite, a beta-spodumene, or a beta-quartz that provides an effective near-zero CTE in a seal having a small or zero mismatch with the substrate. These materials lower the effective CTE in the usual additive sense. Beta-eucryptite is a preferred additive, and will predominate in a mixture. It is produced by ceramming a suitable glass at a temperature in the 1250–1350° C. range for four hours. Its measured CTE is in the range of $-50$ to $-75\times10^{-7}/°$ C.

Both mill additions are glass-ceramics. They are melted as glasses by traditional glass-melting techniques, permitted to crystallize, and then ground to a 20–25 micron powder by ball-milling. After ball-milling, large particles are removed from each filler by either air-classifying, or by sieving through a 400 M screen.

For present purposes, either a lead-zinc-borate, or a tin-zinc-phosphate frit may be employed, or other low melting temperature glasses, in example lead borate. However, laser beam heating of a paste for sealing purposes is necessary in many applications. In that case, a blend with the non-lead, tin-zinc-phosphate frit performs much better and is the preferred frit.

The tin-zinc-phosphate glass family has been described in the Aitken et al. and Francis et al. patents as noted earlier. The teachings of those patents are incorporated in their entirety. For present purposes, we prefer glasses having compositions between the orthophosphate and the pyrophosphate stoichiometries, that is, between 25 and 33 mole % $P_2O_5$, 0–15 mole % ZnO, 0–5 mole % optional oxides including $SiO_2$, $Al_2O_3$, $B_2O_3$ and $WO_3$ with the balance being SnO with the mole ratio of SnO:ZnO preferably being 1–10:1.

In our development work, we have used a base glass near the orthophosphate composition. This glass composition, on a molar basis, consists essentially of 28.5% $P_2O_5$, 1% $B_2O_3$, 0.5% $Al_2O_3$ and SnO and ZnO in a molar ratio of 10:1. The glass was melted at 950° C., cooled by rolling, and then ball-milled to a mean particle size of 20–25 microns.

Various blends of base glass and fillers were prepared by dry-mixing the weighed powders in a roller-mill. The blends were sieved through a coarse screen to achieve additional mixing. Flow was evaluated by hand-pressing a cylindrical, 6 gram flow pellet, placing the pellet on a microscope slide, and firing at the desired thermal cycle. Thermal expansion was measured by making a mismatch sample from a paste of the frit blend with amyl acetate and nitrocellulose. This paste was used to prepare an inverse sandwich seal with two fused silica substrates. This mismatch sample was dried, and then fired at the desired thermal cycle. Expansion mismatch strains in the substrate were measured with a polarimeter.

The following TABLE lists data for several frit blends. Also shown, in terms of tension or compression, is the RT mismatch observed for each blend in an inverse sandwich seal with fused silica. The thermal cycle used was 425° C. for one hour. The composition of each blend is given in weight percent. Frit blends 1 and 3 are either neutral, or in very mild tension, with fused silica. The flow of blends 1 and 3 was very good at the 425° C. sealing temperature used for the samples. These blends appear useful for sealing to a fused silica substrate.

Frit blends 5 and 6 were in very high compression in fused silica sandwich seals. These blends are useful for sealing to the much lower expansion substrate, beta-eucryptite.

A grating device was prepared using these frits. A length of fiber was sealed at 450° C. to a beta-eucryptite plate using frit 6. Polarimetric readings were made on the waveguide fiber. These showed that frit 6 bonded well enough to the beta-eucryptite plate to transfer mismatch strain from the negative expansion substrate to the positive expansion fiber.

TABLE

LOW-EXPANSION, NON-LEAD FRIT BLENDS

|  | 1 | 2 | 3 | 4 | 5 | 6 |
|---|---|---|---|---|---|---|
| Glass | 75 | 70 | 75 | 72.5 | 70 | 70 |
| β-eucryptite | 17.5 | 20 | 15 | 17.5 | 10 | — |
| Co—Mg pyrophosphate | 7.5 | 10 | 10 | 10 | 20 | 30 |
| Flow, mm | 24 | 18 | 23 | 21 | 22 | 25 |
| RT Mismatch | mild tension | neutral | mild tension | mild tension | moderate compression | high compression |

FIG. 1 in the accompanying drawing is a schematic view of an athermal optical fiber grating device 20 in accordance with the invention. Device 20 has a substrate 22 formed from a flat block of a negative expansion material, such as beta-eucryptite. An optical fiber 24, having at least one UV-induced reflective grating 26 written therein, is mounted on the surface 28 of substrate 22. Fiber 24 is attached at either end of the surface 28 at points 30 and 32. Attachment of fiber 24 to substrate 22 at points 30 and 32 is accomplished with a small button of sealing glass material in accordance with the present invention.

In the grating device shown, it is important that fiber 24 is always straight and not subject to compression as a result of the negative expansion. Thus, fiber 24 is usually mounted under tension. Before attachment, it is placed under a controlled tension as shown schematically by the use of a weight 34. The proper choice of tension assures that the fiber is not under compression at all anticipated use temperatures.

Another device in which the present invention finds application is a lightwave optical circuit. This is a device having a fused silica substrate with several optical functions formed thereon. Each function must be provided with a connection to a separate external fiber in much the same manner as electrical connections are required in an integrated circuit. Each connecting fiber must be sealed to, and held in alignment by, a drop of sealing material, in accordance with the present invention. Blends 1 or 3 in the TABLE might be used for this application.

Fusion seals in such optical devices tend to be quite small. This requires careful control of the sealing process. Consequently, it is frequently desirable to use a controllable source of heat, such as a laser, rather than the flame of a conventional burner. Thus, a laser beam may be defocused, that is, focused a short distance off from, or in front of, the target. This avoids overheating which would occur with point focusing.

We have also found it desirable, for many applications, to use indirect heating. For example, in affixing a fiber on a substrate, one or more drops of sealing paste may be applied to a front surface of a substrate. The fiber is then mounted, as shown for example in FIG. 1.

A source of heat, either a burner flame, or a laser beam, is then applied to the back, that is the opposite, surface of the substrate. In this manner, the sealing paste is thermally softened by heat passing through the substrate, rather than by direct heating. This affords better control of the sealing process, and less risk of damage to the device. In the event a laser is used, it may be defocused to avoid damage to the substrate.

Figure 2:
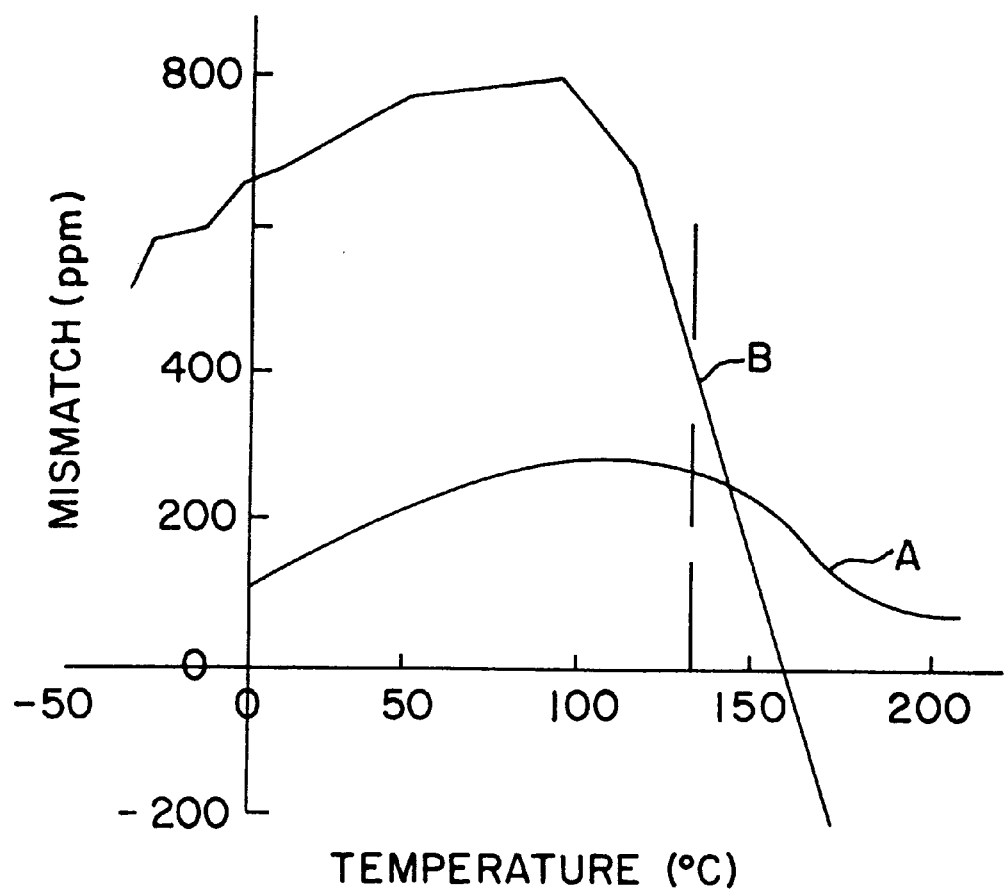
FIG. 2 is a graphical representation of mismatch encountered in seals.

FIG. 2 illustrates the mismatch encountered when two different blends are used in making a sandwich seal with fused silica. Temperature is plotted on the horizontal axis; mismatch in parts/million (ppm) for the substrate is plotted on the vertical axis. The mismatch values for the frit blend have the same numerical values as for the substrate, but with the sign changed from positive to negative. Positive values in FIG. 2 indicate that substrate is in tension, and that the frit blend is in compression.

Curve A shows the mismatch values measured at various temperatures with a seal between blend 1 and fused silica. Curve B shows the rather severe mismatch measured between blend 6 and fused silica where the frit is in a high state of compression. Blend 6 is intended for use with a substrate having a much lower coefficient of thermal expansion (CTE) than fused silica. It is used, for example, with a beta-eucryptite substrate having a CTE of approximately $-50 \times 10^{-7}/°$ C.

The present invention is further directed to optical devices and a method of making such optical devices that substantially obviates one or more of the problems due to limitations and disadvantages of the related art.

Additional features and disadvantages of the invention are set forth in this description, and in part will be apparent from the description, or may be learned by practice of the invention. The objectives and other advantages of the invention will be realized and attained by the apparatus, devices, structures, and methods particularly pointed out in this written description and claims hereof as well as the appended drawings.

To achieve these and other advantages and in accordance with the purpose of the invention, as embodied and broadly described, the invention includes an optical device comprised of an optical waveguide fiber embodying a grating with the fiber affixed to a substrate in order to control optical properties of the fiber embodying the grating which vary with temperature. The substrate defines a first longitudinal channel. The substrate further includes a first crosscut recess which forms a first recessed intersection with the first longitudinal channel. The optical waveguide fiber embodying a grating is in alignment with the first longitudinal channel and affixed to the substrate at the first recessed intersection.

In another aspect, the invention includes a method of making an optical device comprised of an optical waveguide fiber grating and a substrate, wherein the substrate controls temperature variant properties of the optical waveguide fiber grating, this method includes the step of providing a substrate. A further step is forming a void in the substrate with the substrate defining the formed void to have a longitudinal region and at least one traverse crosscut region. A further step is positioning an optical waveguide fiber along the longitudinal region of the void in the substrate. A still further step is providing a flowable adhesive, preferably in a liquidous state, that flows into said longitudinal and traverse regions of the void, wherein the flowable adhesive solidifies into a solid adhesive body which affixes the positioned optical waveguide fiber to the substrate proximate the traverse crosscut region and the longitudinal region of the void.

In another aspect, the invention includes an optical device comprised of an optical waveguide affixed to a substrate with a glass frit fusion seal, preferably comprised of a low melting sealing glass.

In another aspect, the invention includes an optical device comprising an optical waveguide fiber grating, said optical waveguide fiber grating attached to a substrate so that the substrate applies a force to said fiber in order to control temperature variant properties of the optical waveguide fiber grating, wherein said optical waveguide fiber grating is attached to the substrate with an adhesive, said substrate defining a hollow for receiving said adhesive, said hollow having a central region and finger regions extending out from said central region, wherein said adhesive in a fluid state flows into said central region and a finger region and solidifies therein into a solid adhesive body, with said solid adhesive body physically locked into said hollow.

In another aspect, the invention includes an optical device comprising an optical waveguide fiber grating, said optical waveguide fiber grating attached to a substrate so that the substrate applies a force to said fiber in order to control temperature variant properties of the optical waveguide fiber grating wherein the optical waveguide fiber grating is attached to the substrate with a glass frit fusion seal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

The inventive optical device comprises an optical waveguide fiber embodying a grating, with the optical waveguide fiber affixed to a substrate in order to control optical properties of the optical waveguide fiber embodying the grating wherein the optical properties vary with temperature. This device is comprised of a substrate with the substrate defining a first longitudinal channel and a first crosscut recess in the substrate, with the first crosscut recess forming a first recessed intersection with the first longitudinal channel. The optical waveguide fiber is in alignment with the first longitudinal channel and affixed to the substrate at the first recessed intersection. The substrate has a length, width, height and a first surface, being the top surface, and a second surface being the bottom surface. Preferably, the substrate is elongated with its length being proportionally larger than the width and height. Preferably the first longitudinal channel is colinear and aligned with the elongated length of the substrate. Preferably the first longitudinal channel is defined in the first surface of the substrate. Preferably the first crosscut recess comprises a traverse crosscut recess channel in the first surface of the substrate, with this traverse recess channel being traverse to the first longitudinal channel.

The optical device further comprises a second crosscut recess channel, preferably in the first surface of the substrate, with the second crosscut recess forming a second recessed intersection with said first longitudinal channel, wherein the optical waveguide fiber is further affixed to the substrate at this second recessed intersection. This second crosscut recess and the intersection it forms, preferably have the same preferred structure of the first crosscut recess.

Preferably the traverse crosscut recess channels in the substrate are substantially perpendicular to the first longitudinal channel. Preferably the first surface of the substrate which defines the first longitudinal channel further defines said first crosscut recess as a second channel that is substantially perpendicular with the first longitudinal channel.

The optical device further comprises an adhesive for affixing said optical waveguide fiber to said structure, preferably with said adhesive for affixing comprised of a flowable adhesive which solidifies. More preferably the optical device comprises a glass frit fusion seal, formed from a low melting sealing glass, with said glass frit seal substantially filling said first recessed intersection and extending out into said first crosscut recess wherein said optical waveguide fiber is affixed to said substrate of said first recessed intersection with said glass frit fusion seal. Preferably said glass frit fusion seal extends out into the first longitudinal channel.

Preferably the crosscut recesses of the invention have a tapered cross section, such as a dove tail configuration or a conical shape, such as formed by a tapered reamer.

The substrate may be comprised, preferably, of a single material having a unitary structure and composition. Preferably the single unitary substrate material has a naturally and inherent negative thermal coefficient of expansion, such as found with a microcracked lithia aluminosilicate beta-eucryptite glass-ceramic.

The substrate may also be a composite substrate that is comprised of at least two dissimilar materials. The two dissimilar materials have dissimilar thermal coefficients of expansion and are connected together to form the composite substrate that has an effective negative thermal coefficient of expansion due to the dissimilarities of the material and their connection together.

The first longitudinal channel is preferably comprised of a first end and a second distal end remote from the first end, wherein the first crosscut recess forms a first recessed intersection with the first longitudinal channel inboard of the first end and the second distal end. Furthermore, the second crosscut recess forms a second recessed intersection with the first longitudinal channel inboard of the first end and the second distal end, and preferably remote from said first recessed intersection.

Figure 3:
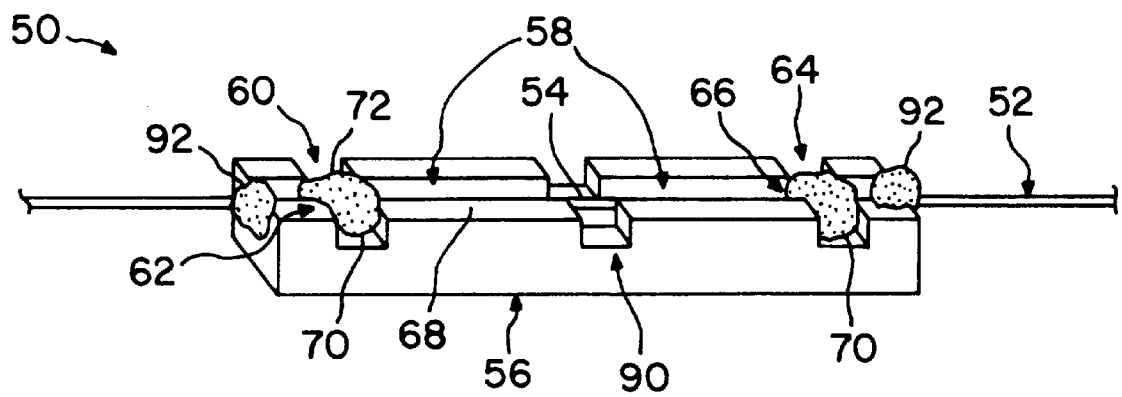
FIG. 3 is a perspective view of a device in which the present invention is embodied.
Figure 4:
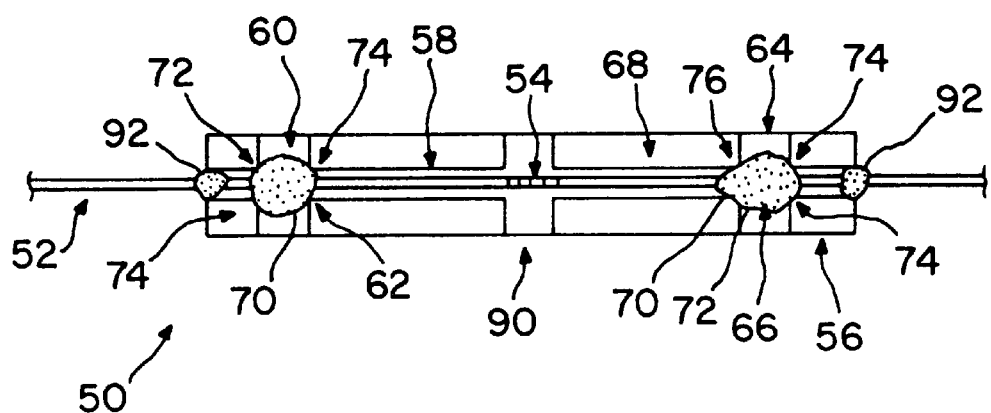
FIG. 4 is a top view of the device shown in FIG. 3.

Reference will now be made in detail to the present preferred embodiments of the invention, examples of which are illustrated in the accompanying drawings. An exemplary embodiment of the inventive optical device is shown in FIGS. 3 and 4 and is designated generally by reference numeral 50. As embodied herein optical device 50 includes an optical waveguide fiber 52 embodying a grating 54, preferably comprised of periodic variations in the index of refraction, preferably a Bragg grating. Optical waveguide fiber 52 is affixed to substrate 56. First crosscut recess 60 forms first recessed intersection 62 with first longitudinal channel 58, with optical waveguide fiber 52 aligned with first longitudinal channel 58 and affixed to substrate 56 at recessed intersection 62. Second crosscut recess 64 forms second recessed intersection 66 with first longitudinal channel 58 with fiber 52 affixed at second recessed intersection 66. Substrate first surface 68 defines first longitudinal channel 58 and first and second crosscut recesses 60 and 64, with first and second crosscut recesses 60 and 64 in the form of channels that are substantially perpendicular with first longitudinal channel 58. Means 70 for affixing optical waveguide 52 to substrate 56 is preferably an adhesive, and most preferably a glass frit fusion seal 72, with glass frit fusion seal 72 substantially filling recessed intersections 62 and 66 and extending out into the crosscut recess regions 74 adjacent said intersections, and additionally extending out into the longitudinal channel regions 76 adjacent said intersections.

Figure 5:
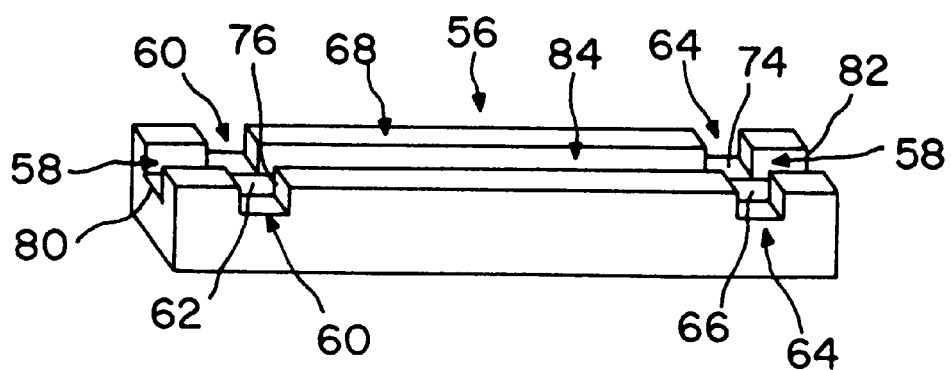
FIG. 5 is a perspective view of a device in which the present invention is embodied.

FIG. 5 shows the presently preferred substrate 56 of the invention which is comprised of a single and unitary material that has a negative thermal coefficient of expansion.

Figure 6:
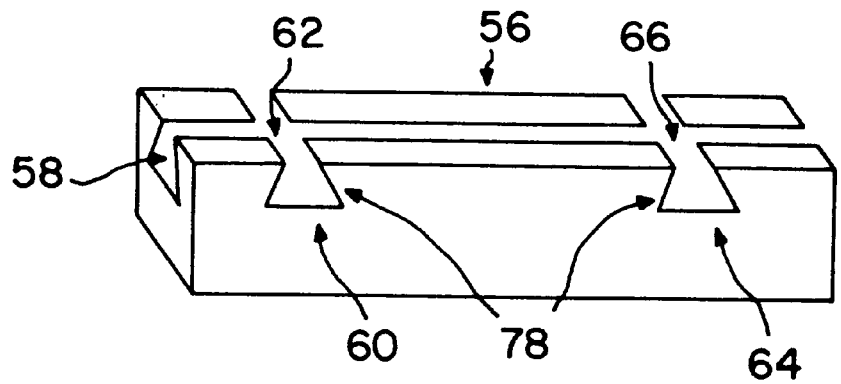
FIG. 6 is a perspective view of a device in which the present invention is embodied.
Figure 7:
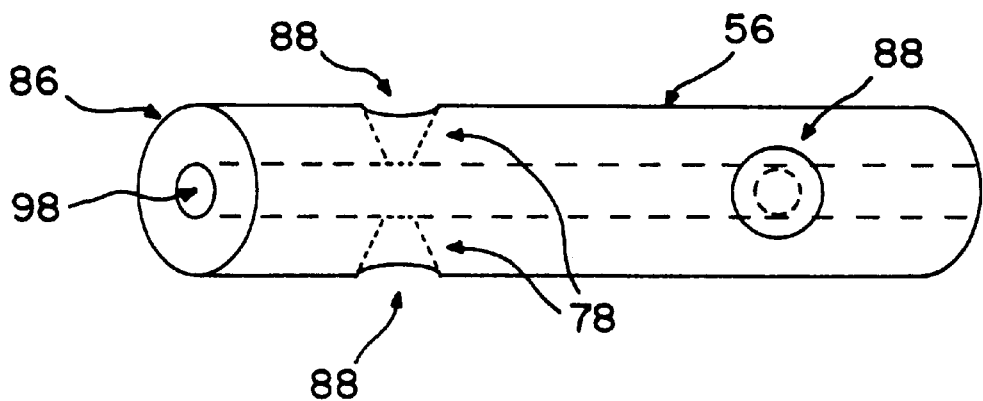
FIG. 7 is a side view of a device in which the present invention is embodied.

FIG. 6 shows an embodiment of the invention wherein crosscut recess 60 and 64 formed in substrate 56 have a tapered cross section 78. Tapered cross section 78, such as the dove tail shape, provide further assurance that adhesive means 70 deposited in intersections 62 and 66 will stay confined and not able to move relative to the substrate. In addition, longitudinal channel 58 may have a tapered cross section. Such tapered cross sectional shapes insure that a vitreous fusion seal formed in intersections 62 and 66 will remain interlocked with substrate 56. As shown in FIG. 7 crosscut recess bore 88 may have a tapered cross section 78 formed by a tapered reamer so that they have a conical shape.

As shown in FIG. 5, first longitudinal channel 58 is comprised of a first end 80 and a second distal end 82, with first crosscut recess 60, first recessed intersection 62, second crosscut recess 64, and second recessed intersection 66 inboard of first end 80 and second distal remote end 82.

The invention further comprises a method of making an optical device comprised of an optical waveguide fiber grating and a substrate wherein the substrate controls temperature variant properties of the optical waveguide fiber grating, with the method having the steps of providing a substrate and forming a void in the provided substrate so that the void has a longitudinal region and at least one traverse crosscut region. The method further includes the steps of positioning an optical waveguide fiber along the longitudinal region of the formed void and providing an adhesive in a fluid state so that it flows into the longitudinal and traverse regions of the void, and substantially covers the bottom surface of the intersection of the longitudinal region with the traverse region, wherein the flowable state adhesive solidifies into a solid adhesive body which affixes the optical waveguide fiber to the substrate proximate the intersection of the traverse crosscut region and the longitudinal region of the void. Preferably the adhesive is provided such that it extends from the intersection and out into the regions of the void proximate the intersection.

In the method of making an optical device 50 comprised of an optical waveguide fiber 52 with a grating 54, preferably providing a substrate 56 includes providing a substrate 56 that is comprised of a single material. Preferably the substrate 56 has a near-zero or negative thermal coefficient of expansion. The method may include providing a substrate 56 that is a composite substrate having at least two dissimilar materials having different thermal coefficients of expansion.

The step of forming a void 84 in substrate 56 preferably includes cutting a slot into the substrate to form longitudinal region 58 of void 84. The step of forming void 84 further includes cutting a slot into substrate 56 substantially perpendicular to the longitudinal region 58 to form traverse crosscut regions 60 and 64. Preferably forming void 84 includes forming a tapered void.

The steps of forming a void 84 having longitudinal regions 58 and traverse crosscut regions 60 and 64 may include the step of drilling holes into substrate 56, preferably with a tapered reamer so as to provide a tapered cross section 78.

The step of positioning an optical waveguide fiber 52 along longitudinal region 58 of void 84 preferably includes positioning fiber 52 inside of void 84, and may further include tensioning fiber 52.

The step of providing an adhesive in a liquidous state so that is flows into longitudinal region 58 and traverse region 60 of void 84, further comprises placing a glass frit, preferably comprised of a low melting sealing glass, preferably having a melting/sealing temperature below about 500° C., in void 84 and proximate optical waveguide fiber 52 and melting said glass frit to a liquidous state, and cooling said liquidous state glass frit to form a glass frit fusion seal 72 in said longitudinal region 58 and traverse crosscut region 60 and intersection thereof which affixes optical waveguide fiber 52 to substrate 56.

An additional embodiment of the invention includes an optical device comprised of an optical waveguide affixed to a substrate with a glass frit fusion seal. Preferably the glass frit fusion seal is comprised of a low melting sealing glass. A preferred glass frit fusion seal is comprised of tin-zinc-phosphate. An alternative and preferred glass frit fusion seal is comprised of lead-zinc-borate. The glass frit fusion seal may be vitreous or devitrified. Optical device 50 is comprised of an optical waveguide 52 affixed with a glass frit fusion seal 72 to a substrate 56, preferably wherein substrate 56 controls a temperature variant optical property of optical waveguide 52. Preferably optical waveguide 52 is comprised of an optical waveguide fiber. Preferably the optical waveguide fiber comprises a grating. Preferably optical waveguide 52 is affixed to substrate 56 with glass frit fusion seal 72 within a void 84 formed in substrate 56 with void 84 having intersecting and traverse channels 58, 60, and 64. Preferably substrate 56 has a near-zero, or negative, thermal coefficient of expansion, and preferably is comprised of a single material. Substrate 56 may comprise a composite substrate having at least two dissimilar materials with dissimilar thermal coefficients of expansion.

A further embodiment of the invention is an optical device 50 comprising optical fiber grating 52 and 54 attached to a substrate 56 so that said substrate applies a force to said fiber in order to control temperature variant properties of optical fiber grating 52 and 54, wherein the optical fiber grating 52 and 54 is attached to substrate 56 with an adhesive, said substrate 56 defining a hollow void 84 for receiving said adhesive, with hollow void 84 having a central intersecting region 62 and 66 and finger regions 74 and 76 extending out from the central intersecting regions, wherein the adhesive preferably flows into the central intersection region 62 and 66 and finger regions 74 and 76, and solidifies therein into a solid adhesive body 70 with said solid adhesive 70 physically locked into said hollow. Physical locking inside of said hollow may be obtained with a tapered cross section 78 so that the solid adhesive body forms a wedge.

A further embodiment of the invention is an optical device comprising an optical waveguide fiber grating attached to a substrate so that the substrate applies a force to said fiber in order to control temperature variant properties of the optical waveguide fiber grating wherein the optical waveguide fiber grating is attached to the substrate with a glass frit fusion seal.

Figure 8:
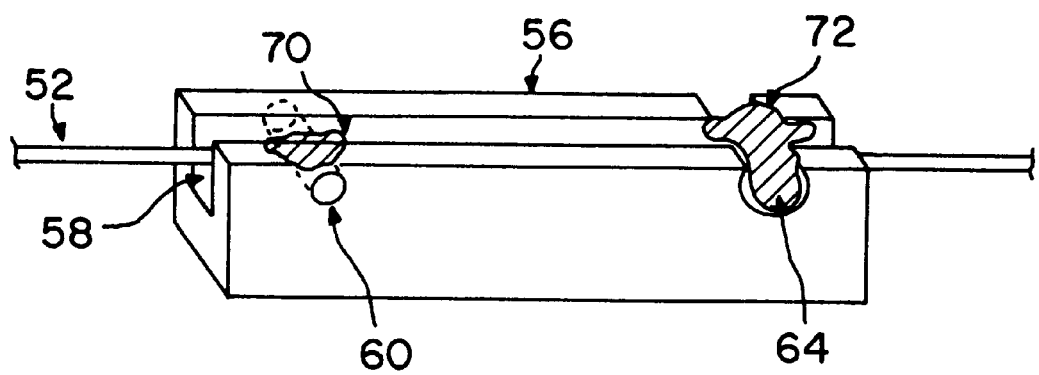
FIG. 8 is a perspective view of a device in which the present invention is embodied.

FIG. 8 shows an additional embodiment of the invention wherein first crosscut recess 60 and second crosscut recess 64 are formed by drilling holes in substrate 56 that intersect and traverse longitudinal channel 58.

Figure 9:
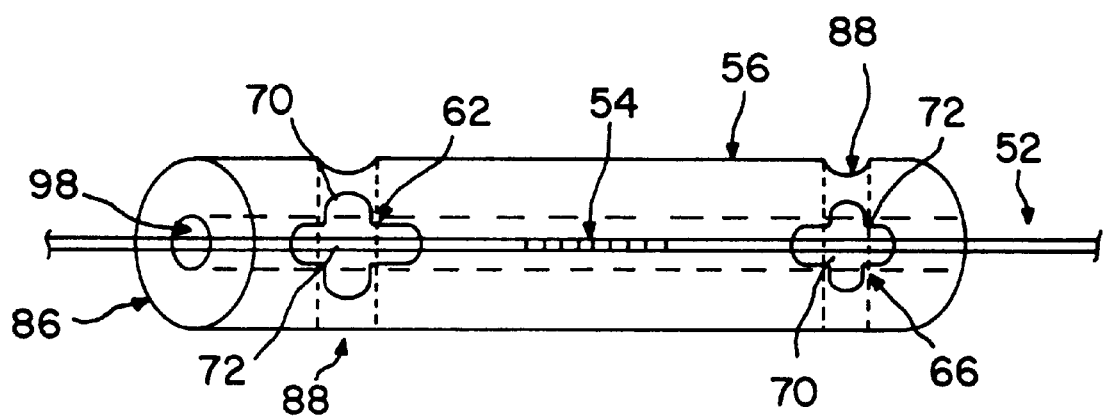
FIG. 9 is a side view of a device in which the present invention is embodied.

FIGS. 7 and 9 show embodiments of the invention wherein substrate 56 is comprised of a longitudinal length of tubing 86 having a longitudinal void bore 98 along the longitudinal length of tubing 86 and internal of tubing 86. Crosscut bores 88 extend through said tubing 86 and traverse longitudinal void bore 98, and form intersections 62 and 66 wherein a fiber 52 is affixed to tubing 86 and inside longitudinal void bore 98 with an adhesive 70 which substantially fills intersections 62 and 66 and extends outward from intersections 62 and 66 and into crosscut bores 88 and longitudinal void bore 98.

An optical device 50 was made using a single material substrate 56 comprised of a microcracked lithia aluminosilicate beta-eucryptite glass-ceramic that had a negative thermal coefficient of expansion. The substrate was an elongated rectangular slab member having a length of about 52 mm, a width of about 4 mm, and a height (vertical thickness) of about 2 mm. A thin diamond grinding wheel having a 1/32 inch (0.8 mm) width was used to cut approximately 0.040 inch (1 mm) deep channels 58, 60, 64, and center crosscut channel 90 in the top surface 68 of the slab substrate 56 as shown in FIGS. 3 and 4. An optical waveguide fiber 52 having a Bragg grating 54 was positioned in longitudinal channel 58 slightly above the substrate surface at the bottom of channel 58 and placed under approximately 10 Kpsi of tension. Television bulb sealing glass frit paste CORNING Code 7580 commercially available from Corning Incorporated, Corning, N.Y. was placed in recessed intersections 62 and 66, and surrounded and covered optical fiber 52 proximate recessed intersections 62 and 66.

A $CO_2$ laser was used to melt the sealing glass frit to a flowable state and then removed so that the flowable state adhesive sealing glass frit solidified into a solid adhesive body glass frit fusion seal. Glass frit fusion seals 72 were mechanically and physically interlocked with substrate 56 and sealed fiber 52 to substrate 56. This structure and method of making provided an optical waveguide fiber that was mechanically and physically interlocked with the substrate wherein the glass frit fusion seal was physically confined within the substrate and the recessed channel. Stress optical measurements of the fiber and grating in center crosscut channel 90 showed that the fiber retained 14 degrees of tension. Epoxy 92 was used to provide a three point connection strain relief when handling optical device 50 because the distinct edge of the fiber/glass frit fusion seal interface can result in a strain and break of the fiber when fiber 52 is moved relative to glass frit fusion seal 72. In addition, in forming the device the protective coating of optical fiber 52 was stripped off the length of the fiber in board and between epoxy contact areas 92 so that epoxy 92 bonded to the protective coating of optical fiber 52 and glass frit fusion seal 72 bonded to the protective coating stripped area of fiber 52. A protective gel, such as Dow-Corning dielectric fluorogel brand Q-36679 type Gel, was used to fill channel 58, and to surround and protect fiber 52 from contaminates and other harm. This optical device provided a particularly robust structure wherein the glass frit fusion seal could not slip or move and was locked in place by its own physical shape. The solid glass frit fusion seal was physically locked with the substrate. The traverse crosscut and longitudinal channel intersection restricted the glass frit fusion seal bodies and prevented their movement and slippage along the length of the optical waveguide fiber.

It will be apparent to those skilled in the art that various modifications and variations can be made of the present invention without departing from the spirit or scope of the invention. Thus it is intended that the present invention cover the modifications and variations of this invention provided they come within the scope of the appended claims and their equivalents.

We claim:

1. An optical waveguide fiber grating substrate device for controlling optical properties of an optical waveguide fiber Bragg grating which vary with temperature, said optical waveguide fiber grating substrate having a negative coefficient of thermal expansion, said substrate defining an adhesive receiving recess, an adhesive, said adhesive received in said recess, wherein said optical waveguide fiber Bragg grating is attached with said adhesive and said recess provides a first force application location wherein the substrate applies a force to the optical waveguide fiber Bragg grating at the first force application location in order to control temperature varying optical properties of the optical waveguide fiber Bragg grating, wherein said substrate defines a second adhesive receiving recess which provides a second force application location for the optical waveguide fiber grating wherein the substrate further applies a force to the optical waveguide fiber grating at the second force application location in order to control temperature varying optical properties of the optical waveguide fiber grating.

2. An optical waveguide fiber Bragg grating substrate device as claimed in claim 1 wherein said substrate comprises a first and a second distal end, wherein said first and second recesses are inboard of said first end and said second distal end.

3. An optical device comprising an optical waveguide fiber Bragg grating, said optical waveguide fiber Bragg grating attached to a substrate so that the substrate applies a force to said fiber in order to control temperature variant properties of the optical waveguide fiber grating:

wherein said optical waveguide fiber grating is attached to the substrate with an adhesive;

said substrate defining a hollow for receiving said adhesive;

wherein said adhesive flows in said void and solidifies therein into a solid adhesive body;

said solid adhesive body locked into said hollow.

4. An optical waveguide fiber Bragg grating substrate device for controlling optical properties of an optical waveguide fiber Bragg grating which vary with temperature, said optical waveguide fiber grating substrate having a negative coefficient of thermal expansion, said substrate defining an adhesive receiving recess, an adhesive, said adhesive received in said recess, wherein said optical waveguide fiber Bragg grating is attached with said adhesive and said recess provides a first force application location wherein the substrate applies a force to the optical waveguide fiber Bragg grating at the first force application location in order to control temperature varying optical properties of the optical waveguide fiber Bragg grating.

5. An optical waveguide fiber Bragg grating substrate device as claimed in claim 4 wherein said adhesive is a glass frit fusion seal.

6. An optical waveguide fiber Bragg grating substrate device as claimed in claim 5 wherein said glass frit fusion seal is a low melting sealing glass.

7. An optical waveguide fiber Bragg grating substrate device as claimed in claim 5 wherein said glass frit fusion seal is comprised of a tin-zinc-phosphate glass.

8. An optical waveguide fiber Bragg grating substrate device as claimed in claim 5 wherein said glass frit fusion seal is comprised of a lead zinc borate glass.

9. A method of making an optical device comprised of an optical waveguide fiber Bragg grating and a substrate, wherein said substrate controls temperature variant properties of said optical waveguide fiber Bragg grating, said method comprising:

providing a substrate;

forming a void in said substrate;

positioning an optical waveguide fiber along said substrate;

providing an adhesive that flows into said void, wherein said adhesive solidifies into a solid which affixes said optical waveguide fiber to said substrate proximate said void.

10. The method of claim 9, wherein providing a substrate further comprises providing a substrate comprised of a single material.

11. The method of claim 10, wherein providing a substrate comprised of a single material further comprises providing a substrate of a single material having a near-zero, or negative, thermal coefficient of expansion.

12. The method of claim 9, wherein providing a substrate further comprises providing a composite substrate comprised of at least two materials having different thermal coefficients of expansion, wherein the composite substrate has an effective negative thermal coefficient of expansion due to the different thermal coefficients of expansion.

13. The method of claim 9, wherein forming a void in said substrate further comprises cutting a slot into said substrate to form said void.

14. The method of claim 9, wherein forming a void in said substrate further comprises forming a tapered void.

15. The method of claim 9, wherein forming a void in said substrate further comprises cutting a slot into a top surface of said substrate, said slot substantially perpendicular to a longitudinal length of said substrate.

16. The method of claim 9, wherein forming a void in said substrate further comprises drilling said substrate.

17. The method of claim 16, wherein drilling said substrate includes drilling with a tapered reamer.

18. The method of claim 9 further comprising providing a glass frit fusion seal which substantially fills said void.

19. The method of claim 18 wherein said glass frit fusion seal is comprised of a tin-zinc-phosphate glass.

20. The method of claim 18 wherein said glass frit fusion seal is comprised of a lead zinc borate glass.

21. The method of claim 9, wherein providing an adhesive that flows into said void, further comprises placing a glass frit in said void and proximate said optical waveguide fiber, melting said glass frit, and cooling said melted glass frit to form a glass frit fusion seal which affixes said optical waveguide fiber to said substrate.

* * * * *